United States Patent
Kirschke et al.

(10) Patent No.: US 6,976,475 B2
(45) Date of Patent: Dec. 20, 2005

(54) METHOD FOR DETECTING A LEAKAGE IN THE INTAKE PORT OF A COMBUSTION ENGINE, AND A COMBUSTION ENGINE EQUIPPED FOR IMPLEMENTING THE METHOD

(75) Inventors: Frank Kirschke, Stadthagen (DE); Helge Bergmann, Braunschweig (DE)

(73) Assignee: Volkswagen AG, Wolfsburg (DE)

( * ) Notice: Subject to any disclaimer, the term of this patent is extended or adjusted under 35 U.S.C. 154(b) by 20 days.

(21) Appl. No.: 10/384,469

(22) Filed: Mar. 6, 2003

(65) Prior Publication Data

US 2003/0209236 A1 Nov. 13, 2003

(30) Foreign Application Priority Data

Mar. 6, 2002 (DE) .......................................... 102 09 870

(51) Int. Cl.$^7$ ................................................ F02M 51/00
(52) U.S. Cl. ........................ 123/494; 123/680; 73/117.3
(58) Field of Search ................................ 123/494, 478, 123/480, 680, 681, 683, 684; 73/117.3, 118.2, 116

(56) References Cited

U.S. PATENT DOCUMENTS

| | | | | |
|---|---|---|---|---|
| 5,357,932 A | * | 10/1994 | Clinton et al. | ............... 123/488 |
| 6,615,812 B2 | * | 9/2003 | Wild et al. | ................... 123/683 |
| 6,644,284 B2 | * | 11/2003 | Pfitz | ........................... 123/479 |

FOREIGN PATENT DOCUMENTS

| DE | 43 22 281 | 1/1995 |
|---|---|---|
| DE | 197 50 191 | 3/1999 |
| DE | 199 41 006 | 3/2001 |
| DE | 100 28 878 | 12/2001 |

OTHER PUBLICATIONS

"Air Leak Detector for IC Engine—Uses Speed–Density–Correction Factor as Ratio of Mass–Air Flow Estimate to Speed–Density Estimate of Mass of Air Entering Cylinder to Indicate Air Leak," AN 1995–128963/17 WPIDS, DNN N1995–10149, PI RD 368014, Thomson Derwent.

* cited by examiner

Primary Examiner—John T. Kwon
(74) Attorney, Agent, or Firm—Kenyon & Kenyon

(57) ABSTRACT

In a combustion engine, the fuel quantity is determined as a function of the inflowing air mass. As a measure for the inflowing air mass, one uses either a main load signal, which is generated by an air-mass flow sensor and represents a measure of the inflowing air mass, or a secondary load signal, which is generated as a function of the degree of throttle of a throttle device in the intake port and of the speed of the combustion engine, to correct the secondary load signal, an air-mass compensation quantity being utilized. The air-mass compensation quantity is generated in operating phases in which the correctness of the main load signal may be assumed, by comparing the main load signal with the secondary load signal. In the case of a leakage of the intake port between the air-mass flow sensor and the throttle device, the main load signal changes, but not the secondary load signal, so that, by evaluating the air-mass compensation quantity, which in such a case assumes an unusual value, a leakage in this section of the intake port may be recognized.

31 Claims, 1 Drawing Sheet

12# METHOD FOR DETECTING A LEAKAGE IN THE INTAKE PORT OF A COMBUSTION ENGINE, AND A COMBUSTION ENGINE EQUIPPED FOR IMPLEMENTING THE METHOD

CROSS-REFERENCE TO RELATED APPLICATIONS

The present application claims priority to Application No. 102 09 870.0, filed in the Federal Republic of Germany on Mar. 6, 2002, which is expressly incorporated herein in its entirety by reference thereto.

FIELD OF THE INVENTION

The present invention relates to a method for detecting a leakage in an intake port of a combustion engine, as well as to a combustion engine for implementing this method.

BACKGROUND INFORMATION

To achieve an optimal performance and/or an optimal consumption in current combustion engines, it may be important that the combustion engine be supplied with a fuel-air mixture having a defined mixture ratio. A defined fuel-air mixture may also be necessary, in particular when the exhaust emissions are to be purified or treated by a catalytic converter, since, as a general rule, the function of a catalytic converter depends significantly on the mixture ratio of the fuel-air mixture used. To achieve a defined fuel-air mixture, a measure for the inflowing air volume in a combustion engine is determined, for example, in a direct measurement using an air-mass flow sensor and, as a function thereof, a specific fuel quantity is supplied, so that the desired fuel-air mixture is adjusted. For this purpose, it may be of considerable importance, however, that the inflowing air volume be able to be precisely defined. However, if a leakage occurs in the intake port, it may no longer be possible to reliably define the air mass flowing into the combustion engine, and this may degrade the performance and consumption of the combustion engine.

It is an object of the present invention to provide a method as well as a combustion engine which may make it possible to detect a leakage in the intake port of the combustion engine with little outlay.

SUMMARY

The above and other beneficial objects of the present invention may be achieved by providing a method and a combustion engine as described herein.

In the operation of the combustion engine, the supplied fuel quantity is metered independence upon the air volume flowing into the combustion engine, i.e., through the intake port, in order to achieve the desired fuel-air mixture. In this context, as a measure for the inflowing air volume, either the main load signal or the secondary load signal is used, the main load signal being generated by the air-mass flow sensor as a function of the air-mass flow rate measured in the intake port. The secondary load signal is determined from the position of the throttle device or the degree of throttle of the throttle device and the speed of the combustion engine and, in contrast to the main load signal, which represents a direct measurement of the air-mass flow rate, represents an indirect measure of the air mass flowing into the combustion engine. The secondary load signal is used, in particular, in dynamic operating states, for example, in the context of substantial speed changes where the secondary load signal more accurately represents the air-mass flow actually flowing through the intake port. In operating phases in which the main load signal accurately reproduces the air-mass flow actually flowing into the combustion engine, the main load signal and the secondary load signal may be the same.

Since, in practice, it may be solely the degree of throttle of the throttle device and the speed of the combustion engine which may make it difficult to accurately determine the rate of the air-mass flow flowing into the combustion engine, when using the secondary load signal to determine the supplied fuel quantity, the air-mass compensation quantity is considered, which is used to correct the secondary load signal. The air-mass compensation quantity may be determined by comparing the main load signal with the secondary load signal. The air-mass compensation quantity may be determined in operating phases of the combustion engine in which the main load signal or the output signal of the air-mass flow sensor is a reliable and correct indication of the rate of the air-mass flow flowing into the combustion engine. It may be assumed in these operating phases that the main load signal correctly represents the air-mass flow flowing into the combustion engine, and that the air-mass compensation quantity is calculated to compensate for the deviation of the secondary load signal from the main load signal when determining the supplied fuel quantity.

If, at this point, a leakage occurs in the intake port of the combustion engine, downstream from the throttle device and the air-mass flow sensor, the same air mass flows via the throttle device and the air-mass flow sensor, so that no there is no deviation between the main load signal and the secondary load signal and, consequently, the air-mass compensation quantity is not changed.

If, on the other hand, the leakage occurs between the throttle device and the air-mass flow sensor, the air-mass flow sensor being positioned upstream from the throttle device in the direction of flow, then different air masses flow via the air-mass flow sensor and the throttle device. The air mass flowing via the throttle device is equal to the air mass flowing via the air-mass flow sensor, plus the amount of unmetered air caused by the leakage. Thus, the main load signal is smaller than the secondary load signal. This deviation is compensated for by the system, in that the air-mass compensation quantity is recalculated. As a result, the calculated air-mass compensation quantity is smaller, although, in actuality, this may be incorrect. Thus, from a specific and, in particular, unusual change in the air-mass compensation quantity, a leakage between the air-mass flow sensor and the throttle device may be reliably inferred.

The air-mass compensation quantity may be monitored in various manners. For example, it is possible to monitor whether the air-mass compensation quantity exceeds or falls below a specific, predefined limiting value. Thus, a range may be predefined for the air-mass compensation quantity within which the air-mass compensation quantity may vary when the intake port does not have any leakage. If the air-mass compensation quantity leaves this range, a leakage signal is generated to indicate a leakage. Changes in the air-mass compensation quantity over time may be monitored, to avoid a faulty leakage detection due to long-term occurrences of drift in various engine parameters.

In addition, variables may be monitored which indicate the time characteristic of the air-mass compensation quantity. These may include, for example, slew rates, time derivations, or extreme values of the time characteristic of the air-mass compensation quantity, etc.

The air-mass compensation quantity may be stored in regular intervals, and an instantaneously determined air-mass compensation quantity may be compared to a previously stored comparison value of the air-mass compensation quantity. A change that possibly occurs in this context may be compared to a predefined limiting value, and the leakage signal may be generated in response to an exceedance. For example, the method for detecting a leakage may be carried out shortly after the start of the combustion engine and, in the process, a value of the air-mass compensation quantity determined during and, in particular, at the end of the previous combustion engine operation, may be utilized as a comparison value for the air-mass compensation quantity. Following start-up of the combustion engine, the leakage detection may be first implemented when the determination of the air-mass compensation quantity has taken effect.

The leakage detection may be implemented, in particular, in operating phases in which the speed of the combustion engine is held at a constant level by influencing the throttle device. This may be the case in idle running.

In an example embodiment of the present invention, in the context of a combustion engine which is additionally provided with a lambda control, the actuating or command signal of the lambda control is also taken into consideration for the leakage diagnosis. In the context of the lambda control, the oxygen content of the exhaust gas of the combustion engine is measured and, as a function thereof, an actuating signal is generated which influences the metered fuel quantity. In the process, as a control objective, the lambda control strives to have the oxygen content in the emission gas correspond to a predefined setpoint value. When, in such a combustion engine, a leakage occurs in the intake port downstream from the air-mass flow sensor, more air flows into the combustion engine than may be measured by the air-mass flow sensor. Given an unchanged, metered fuel quantity, this may lead to an elevated oxygen content in the emission gas, which is recorded by the lambda control and is compensated by an increase in the actuating signal to increase the metered fuel quantity. When the actuating signal of the lambda control is monitored to check whether it is assuming an unusually or abnormally high value, i.e., when the lambda control may intervene with unusual intensity, a leakage in the intake port downstream from the air-mass flow sensor may be recognized in this manner. When, in addition, the information is available from the monitoring of the air-mass compensation quantity, the location of the leakage in the intake port may be ascertained more precisely in this manner. By evaluating the actuating signal of the lambda control, a leakage between the combustion engine and the air-mass flow sensor in the intake port may generally be detected. The exact position of the leakage and, in particular, whether the leakage has occurred upstream or downstream from the throttle device, may have no influence on the actuating signal of the lambda control.

However, when detecting leakage by monitoring the air-mass compensation quantity, it may be significant whether the leakage has occurred upstream or downstream from the throttle device. When the leakage has occurred downstream from the throttle device, the air-mass compensation quantity changes only slightly or not at all, so that the leakage monitoring only responds to a leakage in this section of the intake port by evaluating the actuating signal of the lambda control. When, accordingly, by monitoring the actuating signal of the lambda control, a leakage is recognized in the intake port, the distinction may be made by evaluating the air-mass compensation quantity as to whether the leakage has occurred upstream or downstream from the throttle device.

The present invention is described in the following on the basis of an exemplary embodiment, reference being made to the attached drawing.

BRIEF DESCRIPTION OF THE DRAWING

The FIGURE illustrates schematically the structure of a combustion engine together with the components necessary for implementing the method according to the present invention, in accordance with the exemplary embodiment of the present invention.

DETAILED DESCRIPTION

Figure 1:
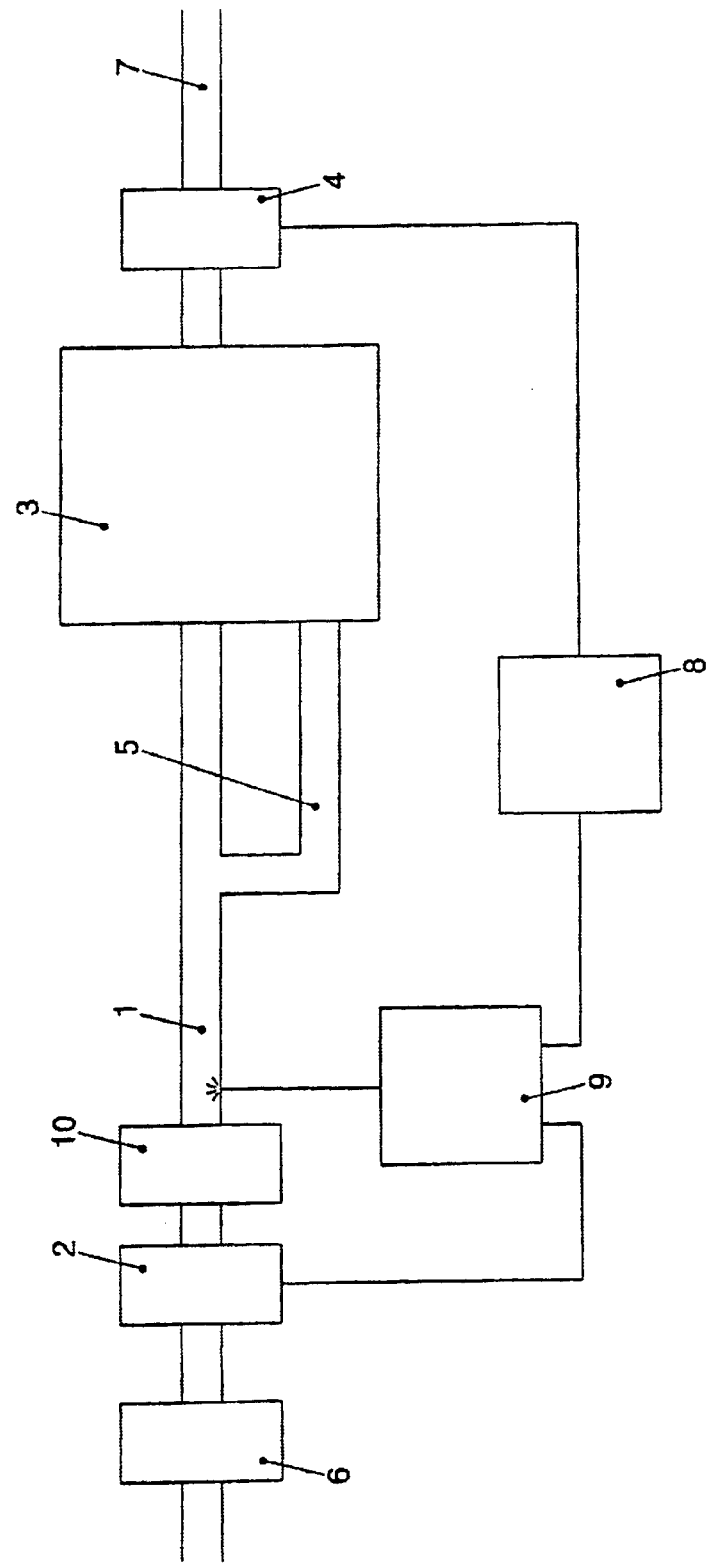

The FIGURE schematically illustrates a combustion engine 3 having an intake port 1 and an exhaust port 7. The air required for combustion is drawn in through intake port 1, whereas the combustion gases are expelled through exhaust port 7. Configured right at the front in intake port 1 is an air filter 6 for purifying the inflowing air. Configured in the direction of flow downstream from air filter 6 is an air-mass flow sensor 2, behind which a throttle device 10 is positioned. Air-mass flow sensor 2 determines the air mass flowing into intake part 1 per unit of time. The purpose of throttle device 10 is to influence the air volume flowing into combustion engine 3.

Combustion engine 3 is a piston engine having a crankcase, to which a crankcase ventilation 5 is assigned. The purpose of crankcase ventilation 5 is to again exhaust fuel vapors which have flowed past the piston and arrived in the crankcase. For that purpose, crankcase ventilation 5 communicates with intake port 1.

A lambda probe 4 is positioned in intake port 7 in order to measure the oxygen content of the combustion gases.

A control device 9 and a lambda control 8 are provided for controlling combustion engine 3, in order to determine fuel quantity 3 necessary for operating combustion engine 3. For this, control device 9 is connected to air-mass flow sensor 2, which routes the result of the air-mass measurement as a main load signal to control device 9. Control device 9 continues to receive an actuating signal from lambda control 8, which is linked, in turn, to lambda probe 4.

Control device 9 is arranged to calculate the required fuel quantity in dependence upon the air mass determined in air-mass flow sensor 2, this being the fuel quantity necessary to achieve a desired fuel-air ratio. Following combustion in combustion engine 3, this preset fuel-air mixture leads to a specific oxygen content of the exhaust emissions in exhaust port 7, which is recorded, in turn, by lambda probe 4 and is able to be controlled toward a setpoint value using lambda control 8.

To this end, with the aid of the actuating signal routed to control device 9, lambda control 8 is designed to influence the supplied fuel quantity, i.e., the fuel-air mixture flowing into combustion engine 3, such that the oxygen content of the combustion gases assumes a specific setpoint value. Thus, by intervening in control device 9, lambda control 8 forms a closed control loop for controlling the oxygen content of the exhaust emission in exhaust port 7.

Control device 9 ascertains the metered fuel quantity essentially by evaluating the air mass flowing into combustion engine 3. To this end, control device 9 uses two different signals, the main load signal and the secondary load signal, the main load signal corresponding to the measuring result of air-mass flow sensor 2 and correctly reproducing the inflowing air mass, at least in steady operating states of combustion engine 3. In parallel to this, a secondary load signal is applied to control device 9 and may be accessed in many and, in particular, highly dynamic operating states, when it may be less accurate in these operating states to record the inflowing air mass via the air-mass flow sensor or by evaluating the main load signal. This secondary load signal is obtained as a function of the position of throttle device 10, i.e., of its degree of throttle, and of the speed of combustion engine 3. To be able to better ascertain the supplied fuel quantity when accessing the secondary load signal, in evaluating the secondary load signal, an air-mass compensation quantity is additionally considered, which is used to correct the secondary load signal. This air-mass compensation quantity is determined by control device 9 in operating phases of combustion engine 3 where it may be assumed that air-mass flow sensor 2 or the main load signal correctly reproduces the air mass flowing into combustion engine 3.

This air-mass compensation quantity is ascertained in regular intervals, in particular upon occurrence of an operating state that is suitable for it. In addition to that, a value for the air-mass compensation quantity, ascertained during a preceding operation of combustion engine 3, is stored as a comparison value for the air-mass compensation quantity. This comparison value is only stored when it is assured by performing appropriate tests that the comparison value has been determined in an error-free state of combustion engine 3. As soon as possible following the start-up of the combustion engine, an instantaneous value of the air-mass compensation quantity is determined and compared with a stored comparison value. When the absolute value of the difference between the ascertained value of the air-mass compensation quantity and the comparison value is above a specific limiting value, this is assessed as being indicative of a leakage in intake port 1.

If, at this point, a leakage occurs in intake port 1 downstream from air-mass flow sensor 2, then this leads to an erroneous measurement by air-mass flow sensor 2. In this case, control device 9 meters too little fuel, so that the fuel content in the fuel-air mixture is too low. This leads to too high of an oxygen content in the exhaust emission in exhaust port 7, i.e., to a deviation of the oxygen content from the setpoint value. This deviation of the oxygen content in exhaust port 7 is recorded by lambda probe 4 and lambda control 8 and is compensated by intervening in control device 9. The greatly intensified control intervention of lambda control 8 is used in this case by control device 9 as a signal for the occurrence of a leakage in intake port 1. For this, control device 9 generates an evaluation signal as a function of the actuating signal of lambda control 8 and evaluates the same. The evaluation signal is generated by control device by multiplying the actuating signal of lambda control 8 by correction factors. The correction factors are generated as a function of the altitude or level at which combustion engine 3 is operated, the temperature of combustion engine 3, and of adaptation values.

The adaptation values are generated by control device 9 in learning phases and considered in determining the actuating signal, in order to consider slowly changing medium-term or long-term influences on the required fuel quantity. These influences may be, for example, the fuel quality, component tolerances, changing combustion conditions, etc. With the aid of the adaptation values, it is possible to keep the actuating signal of lambda control 8 within an optimal range and, in particular, close to the neutral position. Control device 9 generates both additive adaptation values, additively considered in the determination of the actuating signal, as well as multiplicative adaptation values, multiplicatively considered in the determination of the actuating signal, the additive adaptation values being used in the idling operation and the multiplicative adaptation values in the partial-load range.

To evaluate the evaluation signal, a measuring window having a duration of eight seconds is provided in control device 9 in an idle phase of combustion engine 3. For the duration of this measuring window, control device 9 monitors control device 9 to determine whether the evaluation signal of lambda control 8 exceeds an upper limiting value or falls below a lower limiting value. In the process, control device 9 measures a first time duration in which the evaluation signal exceeds the upper limiting value, and a second time duration in which the lower limiting value is not attained. The time period in which the evaluation signal is between these two limiting values, is left out of consideration. In this manner, erroneous detection of a leakage in intake port 1 may be prevented in uncertain cases.

For the duration of the measuring window, the second time period is continually subtracted from the first time period, and the difference obtained is related to the elapsed time period of the measuring window. The result is a ratio which ranges between −1 and +1, depending on the two time periods. Starting with a minimum measuring time of, in particular, four seconds, this ratio is compared to an error threshold, the value of which is 0.8, and an error signal is generated when the ratio is above the error threshold.

Accordingly, a leakage in intake port 1 is recognized when the evaluation signal of lambda control 8 is above the upper limiting value for a long period of time, i.e., when lambda control 8 attempts for a long period of time to meter additional fuel.

To recognize a leakage in intake port 1, control device 9 is also equipped to monitor the air-mass compensation quantity for unusual values or changes. When a leakage occurs between air-mass flow sensor 2 and throttle device 10 in intake port 1, this leads to combustion engine 3 drawing in the air, in part via air-mass flow sensor 2 and, in part via the leakage. As a result, the output signal of air-mass flow sensor 2 and, consequently, the main load signal are reduced. On the other hand, the secondary load signal remains constant, since the leakage upstream, in the direction of flow, from throttle device 10 prevents the air mass flowing into combustion engine 3 from increasing and, therefore, also does not affect the speed of combustion engine 3 or the degree of throttle of throttle device 10. Therefore, the leakage between air-mass flow sensor 2 and throttle device 10 leads to a difference between the main load signal and the secondary load signal and, thus, to a change in the air-mass compensation quantity. Control device 9 monitors whether the air-mass compensation quantity falls below a specific value and, in response to such an occurrence, generates a leakage signal indicating a leakage in intake port 1. In addition, as previously described, control device 9 is able to evaluate the difference between the active air-mass compensation quantity and a stored comparison value.

It is different, however, when the leakage occurs in the intake port between throttle device 10 and combustion engine 3, for example due to a faulty connection between crankcase ventilation 5 and intake port 1. In such a case, the air mass flowing through air-mass flow sensor 2 is decreased, so that the main load signal is reduced. Since, in this case, the leakage occurs in a section of intake port 1 that is acted upon by vacuum pressure, the air mass flowing into combustion chamber 3 is increased because of the leakage. This influences the secondary load signal in various manners. This signal decreases in this manner, in particular due to intervention by an idle-speed control.

Since in response to a leakage in the intake port between throttle device 10 and combustion engine 3, both the main load signal as well as the secondary load signal decrease, this leads to no or only to a slight change in the air-mass compensation quantity. For this reason, control device 9 is able to distinguish whether the leakage occurred in intake port 1 upstream or downstream from throttle device 10.

When the evaluation signal generated as a function of the actuating signal of lambda control 8 points to a leakage in intake port 1, and the change in the air-mass compensation quantity exceeds a specific limiting value, then this is indicative of a leakage between air-mass flow sensor 2 and throttle device 10. If, on the other hand, the evaluation signal indicates a leakage, and the air-mass compensation quantity was only changed slightly or not at all, then this indicates a leakage between throttle device 10 and combustion engine 3.

REFERENCE SYMBOL LIST 1 intake port
2 air-mass flow sensor
3 combustion engine
4 lambda probe
5 crankcase ventilation
6 air filter
7 exhaust port
8 lambda control
9 control device
10 throttle device

What is claimed is:

1. A method for detecting leakage in an intake port of a combustion engine, a throttle device and an air-mass flow sensor arranged in the intake port, comprising:
    determining a supplied fuel quantity as a function of one of:
        a main load signal generated by the air-mass flow sensor as a function of measured air-mass flow; and
        a secondary load signal generated as a function of a degree of throttle of the throttle device and of a speed of the combustion engine and an air-mass compensation quantity ascertained by comparing the main load signal with the secondary load signal; and
    generating a leakage signal indicating the leakage in the intake port as a function of the air-mass compensation quantity.

2. A method for detecting leakage in an intake port of a combustion engine, a throttle device and an air-mass flow sensor arranged in the intake port, comprising:
    determining a supplied fuel quantity as a function of one of:
        a main load signal generated by the air-mass flow sensor as a function of measured air-mass flow; and
        a secondary load signal generated as a function of a degree of throttle of the throttle device and of a speed of the combustion engine and an air-mass compensation quantity ascertained by comparing the main load signal with the secondary load signal; and
    generating a leakage signal indicating the leakage in the intake port as a function of the air-mass compensation quantity;
    wherein the leakage signal is generated in the generating step as a function of whether at least one of the air-mass compensation quantity and a quantity characterizing the time characteristic of the air-mass compensation quantity one of (a) exceeds and (b) falls below a predefined limiting value.

3. The method according to claim 2, wherein the leakage signal is generated in the generating step as a function of whether a change in the air-mass compensation quantity over time one of (a) exceeds and (b) falls below a predefined limiting value.

4. The method according to claim 1, further comprising recognizing the leakage in the intake port during an operating phase of the combustion engine in which the speed of the combustion engine is kept constant by a control including an actuator arranged to actuate the throttle device.

5. The method according to claim 1, further comprising detecting the leakage in the intake port during an idle running of the combustion engine.

6. A method for detecting leakage in an intake port of a combustion engine, a throttle device and an air-mass flow sensor arranged in the intake port, comprising:
    determining a supplied fuel quantity as a function of one of:
        a main load signal generated by the air-mass flow sensor as a function of measured air-mass flow; and
        a secondary load signal generated as a function of a degree of throttle of the throttle device and of a speed of the combustion engine and an air-mass compensation quantity ascertained by comparing the main load signal with the secondary load signal;
    generating a leakage signal indicating the leakage in the intake port as a function of the air-mass compensation quantity; and
    forming a difference between the air-mass compensation quantity ascertained during an operation of the combustion engine and a comparison value of the air-mass compensation quantity ascertained and stored during a preceding operation of the combustion engine, wherein the leakage signal is generated in the generating step as a function of whether the difference one of (a) exceeds and (b) falls below a predefined limiting value.

7. The method according to claim 1, further comprising detecting the leakage in the intake port after a specific time duration following a start of the combustion engine.

8. The method according to claim 1, wherein the throttle device is arranged in a direction of flow downstream from the air-mass flow sensor.

9. The method according to claim 1, further comprising determining the air-mass compensation quantity to correspond to a difference between the main load signal ascertained at a specific instant and the secondary load signal ascertained at the specific instant.

10. A method for detecting leakage in an intake port of a combustion engine, a throttle device and an air-mass flow sensor arranged in the intake port, comprising:
    determining a supplied fuel quantity as a function of one of:
        a main load signal generated by the air-mass flow sensor as a function of measured air-mass flow; and
        a secondary load signal generated as a function of a degree of throttle of the throttle device and of a speed of the combustion engine and an air-mass compensation quantity ascertained by comparing the main load signal with the secondary load signal; and
    generating a leakage signal indicating the leakage in the intake port as a function of the air-mass compensation quantity;
    wherein the supplied fuel quantity is determined in the determining step from an actuating signal of a lambda control arranged to measure oxygen content of emission gas of the combustion engine following combustion and to influence the actuating signal so that the oxygen content of the emission gas assumes a specific value, the method further comprising:

generating an evaluation signal as a function of the actuating signal of the lambda control; and monitoring the evaluation signal with respect to the evaluation signal one of exceeding and falling below a limiting value;

wherein the leakage signal is generated in the leakage signal generating step as a function of the air-mass compensation quantity and the evaluation signal.

11. The method according to claim 10, wherein a dependency of the supplied fuel quantity on an inflowing air mass is a specific stoichiometric ratio between the air mass and the fuel quantity.

12. The method according to claim 10, further comprising detecting the leakage in the intake port during an idle running of the combustion engine.

13. The method according to claim 10, wherein the evaluation signal is generated in the evaluation signal generating step by multiplying the actuating signal of the lambda control by at least one compensation value generated as a function of at least one adaptation value, the adaption value generated by the lambda control in specific operating phases of the combustion engine and used to influence the actuating signal of the lambda control.

14. The method according to claim 13, further comprising generating the at least one compensation value as a function of a change in the at least one adaptation value.

15. The method according to claim 13, further comprising generating a multiplicative adaptation value that acts multiplicatively in a determination of the actuating signal.

16. The method according to claim 13, further comprising generating an additive adaptation value that acts additively in a determination of the actuating signal.

17. The method according to claim 10, wherein the evaluation signal is generated in the evaluation signal generating step by multiplying the actuating signal of the lambda control by an altitude-compensation value generated as a function of altitude of the combustion engine.

18. The method according to claim 10, wherein the evaluation signal is generated in the evaluation signal generating step by multiplying the actuating signal of the lambda control by a temperature-compensation value generated as a function of a temperature of the combustion engine.

19. The method according to claim 10, further comprising:

in a time period of a measuring window, measuring a first time period in which the evaluation signal exceeds the limiting value and determining a second time period in which the actuating signal falls below the limiting value;

obtaining a reference quantity in accordance with a difference between the first time period and the second time period in relation to an elapsed time period of the measuring window; and comparing the reference quantity to an error threshold to detect the leakage in the intake port.

20. The method according to claim 19, wherein a total time period of the measuring window is eight seconds, the method further comprising the step of first permitting leakage detection following a minimum time duration of four seconds.

21. A combustion engine, comprising:

an intake port;

an air-mass flow sensor positioned in the intake port;

a throttle device positioned in the intake port; and a control device arranged to determine a supplied fuel quantity as a function of one of:

a main load signal generated by the air-mass flow sensor as a function of measured air-mass flow; and a secondary load signal generated by the control device as a function of a degree of throttle of the throttle device and a speed of the combustion engine and an air-mass compensation quantity ascertained by the control device in accordance with a comparison of the main load signal and the secondary load signal;

wherein the control device is configured to generate a leakage signal that indicates a leakage in the intake port as a function of the air-mass compensation quantity.

22. The combustion engine according to claim 21, wherein the control device is configured to perform a method for detecting leakage in the intake port including:

determining the supplied fuel quantity as a function of one of:

the main load signal generated by the air-mass flow sensor as a function of the measured air-mass flow; and the secondary load signal generated as a function of the degree of throttle of the throttle device and of the speed of the combustion engine and the air-mass compensation quantity ascertained by comparing the main load signal with the secondary load signal; and generating the leakage signal indicating the leakage in the intake port as a function of the air-mass compensation quantity.

23. A combustion engine, comprising:

an intake port;

an air-mass flow sensor positioned in the intake port;

a throttle device positioned in the intake port; and a control device arranged to determine a supplied fuel quantity as a function of one of:

a main load signal generated by the air-mass flow sensor as a function of measured air-mass flow; and a secondary load signal generated by the control device as a function of a degree of throttle of the throttle device and a speed of the combustion engine and an air-mass compensation quantity ascertained by the control device in accordance with a comparison of the main load signal and the secondary load signal;

wherein the control device is configured to generate a leakage signal that indicates a leakage in the intake port as a function of the air-mass compensation quantity;

wherein the control device is configured to perform a method for detecting leakage in the intake port including:

determining the supplied fuel quantity as a function of one of:

the main load signal generated by the air-mass flow sensor as a function of the measured air-mass flow; and the secondary load signal generated as a function of the degree of throttle of the throttle device and of the speed of the combustion engine and the air-mass compensation quantity ascertained by comparing the main load signal with the secondary load signal; and generating the leakage signal indicating the leakage in the intake port as a function of the air-mass compensation quantity; and wherein the leakage signal is generated in the generating step as a function of whether at least one of the air-mass compensation quantity and a quantity characterizing a time characteristic of the air-mass compensation quantity one of (a) exceeds and (b) falls below a predefined limiting value.

24. The combustion engine according to claim 23, wherein the leakage signal is generated in the generating step as a function of whether a change in the air-mass compensation quantity over time one of (a) exceeds and (b) falls below a predefined limiting value.

25. The combustion engine according to claim 22, wherein the method further includes recognizing the leakage in the intake port during an operating phase of the combustion engine in which the speed of the combustion engine is kept constant by a control including an actuator arranged to actuate the throttle device.

26. The combustion engine according to claim 22, wherein the method further includes detecting the leakage in the intake port during an idle running of the combustion engine.

27. A combustion engine comprising:
an intake port;
an air-mass flow sensor positioned in the intake port;
a throttle device positioned in the intake port; and
a control device arranged to determine a supplied fuel quantity as a function of one of:
  a main load signal generated by the air-mass flow sensor as a function of measured air-mass flow; and
  a secondary load signal generated by the control device as a function of a degree of throttle of the throttle device and a speed of the combustion engine and an air-mass compensation quantity ascertained by the control device in accordance with a comparison of the main load signal and the secondary load signal;
wherein the control device is configured to generate a leakage signal that indicates a leakage in the intake port as a function of the air-mass compensation quantity;
wherein the control device is configured to perform a method for detecting leakage in the intake port including:
determining the supplied fuel quantity as a function of one of:
  the main load signal generated by the air-mass flow sensor as a function of the measured air-mass flow; and
  the secondary load signal generated as a function of the degree of throttle of the throttle device and of the speed of the combustion engine and the air-mass compensation quantity ascertained by comparing the main load signal with the secondary load signal;
generating the leakage signal indicating the leakage in the intake port as a function of the air-mass compensation quantity; and
forming a difference between the air-mass compensation quantity ascertained during an operation of the combustion engine and a comparison value of the air-mass compensation quantity ascertained and stored during a preceding operation of the combustion engine, the leakage signal generated in the generating step as a function of whether the difference one of (a) exceeds and (b) falls below a predefined limiting value.

28. The combustion engine according to claim 22, wherein the method further includes detecting the leakage in the intake port after a specific time duration following a start of the combustion engine.

29. The combustion engine according to claim 22, wherein the throttle device is arranged in a direction of flow downstream from the air-mass flow sensor.

30. The combustion engine according to claim 22, wherein the method further includes determining the air-mass compensation quantity to correspond to a difference between the main load signal ascertained at a specific instant and the secondary load signal ascertained at the specific instant.

31. A combustion engine comprising:
an intake port;
an air-mass flow sensor positioned in the intake port;
a throttle device positioned in the intake port; and
a control device arranged to determine a supplied fuel quantity as a function of one of:
  a main load signal generated by the air-mass flow sensor as a function of measured air-mass flow; and
  a secondary load signal generated by the control device as a function of a degree of throttle of the throttle device and a speed of the combustion engine and an air-mass compensation quantity ascertained by the control device in accordance with a comparison of the main load signal and the secondary load signal;
wherein the control device is configured to generate a leakage signal that indicates a leakage in the intake port as a function of the air-mass compensation quantity;
wherein the control device is configured to perform a method for detecting leakage in the intake port including:
determining the supplied fuel quantity as a function of one of:
  the main load signal generated by the air-mass flow sensor as a function of the measured air-mass flow; and
  the secondary load signal generated as a function of the degree of throttle of the throttle device and of the speed of the combustion engine and the air-mass compensation quantity ascertained by comparing the main load signal with the secondary load signal;
generating the leakage signal indicating the leakage in the intake port as a function of the air-mass compensation quantity;
wherein the supplied fuel quantity is determined in the determining step from an actuating signal of a lambda control arranged to measure oxygen content of emission gas of the combustion engine following combustion and to influence the actuating signal so that the oxygen content of the emission gas assumes a specific value, the method further including:
generating an evaluation signal as a function of the actuating signal of the lambda control; and
monitoring the evaluation signal with respect to the evaluation signal one of (a) exceeding and (b) falling below a limiting value;
wherein the leakage signal is generated in the leakage signal generating step as a function of the air-mass compensation quantity and the evaluation signal.

* * * * *

UNITED STATES PATENT AND TRADEMARK OFFICE
CERTIFICATE OF CORRECTION

| | | |
|---|---|---|
| PATENT NO. | : 6,976,475 B2 | Page 1 of 1 |
| APPLICATION NO. | : 10/384469 | |
| DATED | : December 20, 2005 | |
| INVENTOR(S) | : Kirschke et al. | |

It is certified that error appears in the above-identified patent and that said Letters Patent is hereby corrected as shown below:

Column 1, line 53, change "independence" to --in depedence--

Signed and Sealed this

Twelfth Day of September, 2006

JON W. DUDAS
*Director of the United States Patent and Trademark Office*